US012762850B2

(12) United States Patent
Costea et al.

(10) Patent No.: US 12,762,850 B2
(45) Date of Patent: Oct. 13, 2026

(54) AUTOMATED OBJECT PROTRUSION LOSS ADJUSTMENT

(71) Applicant: Zoox, Inc., Foster City, CA (US)

(72) Inventors: Arthur Daniel Costea, Foster City, CA (US); Rajendramayavan Rajendran Sathyam, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 119 days.

(21) Appl. No.: 18/956,093

(22) Filed: Nov. 22, 2024

(65) Prior Publication Data

US 2026/0148535 A1 May 28, 2026

(51) Int. Cl.

| | |
|---|---|
| ***G06V 10/776*** | (2022.01) |
| ***G06T 17/00*** | (2006.01) |
| ***G06V 10/774*** | (2022.01) |
| ***G06V 20/58*** | (2022.01) |
| ***G06V 20/64*** | (2022.01) |
| ***G06V 20/70*** | (2022.01) |

(52) U.S. Cl.

CPC ............ *G06V 10/776* (2022.01); *G06T 17/00* (2013.01); *G06V 10/774* (2022.01); *G06V 20/58* (2022.01); *G06V 20/64* (2022.01); *G06V 20/70* (2022.01)

(58) Field of Classification Search

None

See application file for complete search history.

(56) References Cited

U.S. PATENT DOCUMENTS

| | | | | |
|---|---|---|---|---|
| 12,322,068 | B1 * | 6/2025 | Kim | G06T 5/60 |
| 2020/0158514 | A1 * | 5/2020 | Moloney | G01C 21/20 |
| 2022/0067983 | A1 * | 3/2022 | Fidler | G06V 20/58 |
| 2023/0060270 | A1 | 3/2023 | Kim et al. | |
| 2024/0185523 | A1 * | 6/2024 | Zhang | G06F 30/27 |
| 2024/0416963 | A1 * | 12/2024 | Li | B60W 60/0016 |
| 2025/0291559 | A1 * | 9/2025 | Lu | G06F 40/40 |

FOREIGN PATENT DOCUMENTS

| | | | |
|---|---|---|---|
| CN | 115453563 | A | 12/2022 |
| CN | 116256720 | A | 6/2023 |
| CN | 117523524 | A | 2/2024 |
| CN | 118537676 | A | 8/2024 |

OTHER PUBLICATIONS

Search Report and Written Opinion for corresponding International Application No. PCT/US25/55861, dated Apr. 20, 2026, 9 pages.

* cited by examiner

*Primary Examiner* — Nurun Flora

(74) *Attorney, Agent, or Firm* — Lee & Hayes, P.C.

(57) ABSTRACT

Techniques for determining labels and occupancy data for voxels and pixels representing object protrusions are disclosed. The occupancy status of voxels surrounding an occupied voxel is determined and used to determine the occupancy density of the occupied voxel. The loss for the occupied voxel is adjusted inversely proportionately to the occupancy density. The adjusted-loss voxel is used to train a machine-learned model to detect objects in an environment and, specifically, to more accurately detect objects having protrusions that may otherwise not be associated with the object. This model may be used to provide data used to control a vehicle.

20 Claims, 5 Drawing Sheets

AUTOMATED OBJECT PROTRUSION LOSS ADJUSTMENT

BACKGROUND

Various systems and techniques are utilized to perform detection of objects, such as vehicles, pedestrians, and bicycles, in an environment. For example, autonomous vehicles may be configured with lidar systems that use lasers to emit pulses into an environment and sensors to detect pulses that are reflected back from surfaces of objects in the environment. Various properties of the reflected pulses can be measured to generate data representing the presence and various characteristics of objects in the environment. In many environments, there may be solid objects that reflect such pulses but do not impede the travel of a vehicle because they are too small to have a substantial effect on the vehicle or the object if encountered. Such non-impeding objects may also be likely to move out of the path of travel before the vehicle encounters such objects. For example, birds, bats, large insects, other small flying animals, and other small flying objects (e.g., wind-blown paper, plastic bags) may be non-impeding objects that reflect laser pulses but may not affect vehicle travel. However, there may also be other objects, or portions of objects, that have detection characteristics similar to those of non-impeding objects but are actually object that may affect vehicle travel, such as protruding portions of larger objects (e.g., forklift forks, open car doors, extended tailgates, etc.). Pulses reflected off such an object protrusion may produce a false positive indication of a non-impeding object, even though the protrusion may impede the movement of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
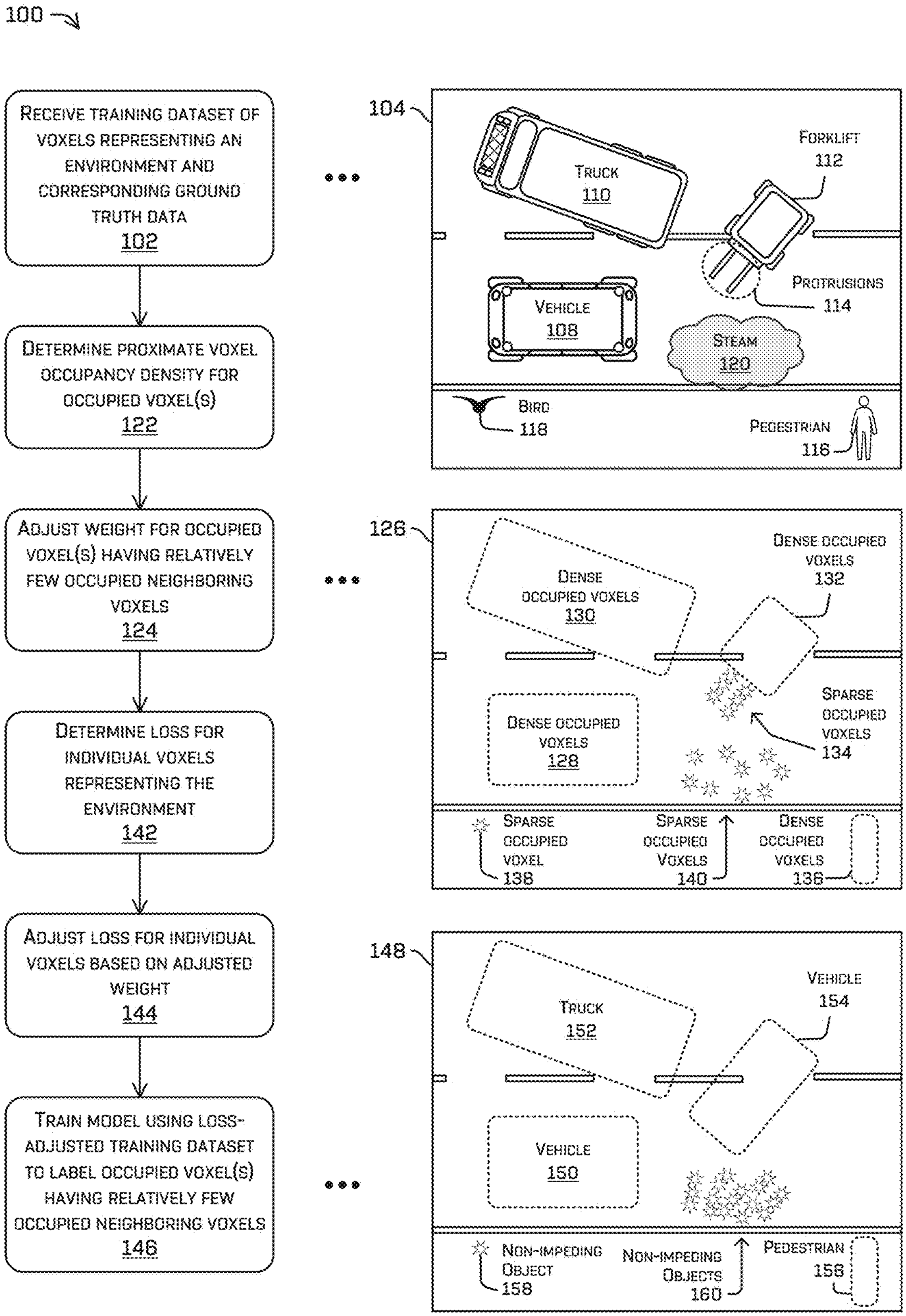
FIG. 1 is a pictorial flow diagram of an example process for determining an object classification for detection data based on data representing an environment, in accordance with examples of the disclosure.

Techniques for improving object protrusion detection and for training models to identify and classify object protrusions and associated detections are described herein. Such techniques may include training a model to identify object protrusions and differentiate protrusions for non-impending objects in order to label data associated with object protrusions accurately. In various examples, lidar points and/or other data associated with an environment may be evaluated for potential association with an object protrusion. The data associated with the environment may then be weighted proportionately to its potential association with an object protrusion. This weighted data may then be used to train a machine-learned object detection model. The trained machine-learned object detection model may then be used, for example, in conjunction with other perception and/or classification systems and/or components, to detect and label objects in a real-world environment at a vehicle that may be traveling through the environment.

In examples, sensors of an autonomous vehicle may capture sensor data and/or other data that may be used to determine a representation of an environment, which may include objects separate from the autonomous vehicle, such as other vehicles or pedestrians. A two-dimensional image representing the environment from a top-down perspective may be generated based, at least in part, on the sensor data. Image data for such an image may include pixel data associated with specific pixels in the image. The pixel data can be used to determine detection boxes representing objects in the environment. Alternatively, the pixel data may be used to generate object contours indicating the extents of objects. The autonomous vehicle may then use such detection boxes and/or contours to safely navigate through the environment.

Alternatively or additionally, sensors of an autonomous vehicle may capture sensor data and/or other environmental data (e.g., data representing aspects of an environment that may or may not be based on sensor data, such as velocity, direction, etc.) that may be "voxelized" by uniformly dividing the space into three-dimensional cubes ("voxels") representing sections of that portion of the space to generate a three-dimensional representation of the space in the environment. The data associated with the individual sensor points (e.g., lidar points, radar points, sonar points, image points, etc.) within individual voxels may be used to generate a three-dimensional voxel data structure representing the environment. The data associated with the individual sensor points and/or other data units within individual voxels may be aggregated to generate single, representative data values for such individual voxels that may then be used in the operations as described herein. This aggregated sensor point data may be referred to as "voxelized sensor point data." Note that a "detection box" and "contour" as used herein may also refer to a voxel data structure and any data and/or operations associated with voxels described herein may also be applicable to pixels.

Relatively large objects in an environment, such as trucks, cars, other types of vehicles, pedestrians, etc., may be associated with "dense" sensor points. That is, there may be many reflections detected by a sensor system at the location of the object. For example, a vehicle in an environment may be readily detected by a sensor system based on the many reflections from surfaces of the vehicle. Based on these dense sensor points, an autonomous vehicle's vehicle computing system may identify and classify these large objects as objects to be accounted for in determining the trajectory of the vehicle or objects to otherwise consider in determining vehicle operations.

On the other hand, relatively small objects in an environment may be associated with "sparse" sensor points, where only one or a few reflections from the surfaces of such objects may be detected in the location of the object by a sensor system. Based on these sparse points, an autonomous vehicle's vehicle computing system may identify and classify these small objects as objects that need not be accounted for in determining the trajectory of the vehicle or objects to otherwise disregard in determining vehicle operations. This is because such non-impeding objects may be objects in an environment that generally should not impede motion of an autonomous vehicle in the environment, such as small moving objects (e.g., birds, leaves, bats, wind-blown debris), objects composed of fine particulate matter or gases (e.g., dust, fog, steam, smoke), and other objects that are immaterial to vehicle progress (e.g., plastic bags, paper debris, tumbleweed, leaves, etc.).

Some objects in an environment may be relatively large objects with one or more smaller portions that protrude from the object. Examples of these smaller portions of larger objects may include the forks of a forklift; a truck tailgate; a truck ramp; and an open car door, trunk, or hood (generally referred to herein as "object protrusions"). Because these smaller portions of larger objects may be associated with relatively few and/or sparse sensor points in data representing the environment, these portions may be classified as non-impeding objects and/or unoccupied space. However, because these smaller portions are parts of larger objects, they may, in fact, impede the operation of a vehicle. An incorrectly labeled object protrusion may cause an autonomous vehicle to proceed through an area occupied by the object protrusion rather than stopping or steering around the object protrusion in order to avoid impact with the object protrusion. Correct classification of such object protrusions is related to safe operation of the vehicle through an environment. The disclosed techniques have been found to enable labeling of such object protrusion to a high degree of accuracy to support autonomous vehicle operations.

According to the techniques described herein, objects, including object protrusions, may be detected by a sensor system and determined to be objects of particular types by a vehicle computing system (e.g., by a machine-learned model executed by the vehicle computing system using sensor data). When the vehicle computing system determines that an object may potentially affect a vehicle's travel through an environment (e.g., another vehicle, a pedestrian, a barrier, or any other potentially impeding object), the vehicle computing system (e.g., a planning component of the vehicle computing system) may plan a trajectory that accounts for that object and controls the travel of a vehicle through an environment in a way to avoid contact with that object. When the vehicle computing system determines that an object is a non-impeding object, the vehicle computing system (e.g., a planning component of the vehicle computing system) may plan a trajectory that disregards that object because a non-impeding object will not impede the travel of a vehicle through an environment. However, an inaccurate labeling of a portion of a larger solid or otherwise vehicle-impeding object as a non-impeding object may result in a hazardous vehicle trajectory. The techniques described herein may improve the accuracy of impeding and non-impeding object determinations and labeling, the accuracy of labeling sensor data points and/or segments associated with such objects, and, in particular, the accuracy of labeling object protrusions associated with larger objects by one or more machine-learned models trained and/or executed according to the disclosed examples.

In various examples, a system may train a machine-learned model to perform auto-labeling of objects, including objects associated with one or more object protrusions, using a training dataset that includes data representing sensor data collected in an environment. Such sensor data may include lidar data, radar data, sonar data, image data, audio data, etc. For example, such data may include lidar data associated with one or more lidar points (e.g., reflections of one or more lidar pulses). The lidar data in a training dataset may represent groups of one or more lidar points referred to as "lidar segments." Lidar segments may be groups of one or more lidar points that are (e.g., geographically, physically) proximate to one another and/or have other similar characteristics that may indicate such points may be associated with a particular object. In various examples, a lidar segment may include at least a threshold quantity of lidar points to be included as a segment in a training dataset. For example, individual segments in a dataset may be associated with two or more lidar points, three or more lidar points, four or more lidar points, etc. Alternatively, segments in a dataset may be associated with one or more lidar points (e.g., a segment may include one lidar point and/or associated data). Alternatively or additionally, individual lidar points and associated data may be included in a dataset along with, or instead of, lidar segments. In such examples, individual lidar points and associated data may be processed as described herein, while in other examples, individual lidar points and associated data may be filtered from the dataset before processing segments associated with the dataset as described herein.

The training dataset may be voxelized with individual voxels representing sensor data (e.g., lidar data, radar data, vision data, audio data, etc.), as well as other data that may be associated with objects represented by sensor data, such as velocity, acceleration, and direction. In examples, the system may generate, or otherwise determine (e.g., receive), a ground truth dataset that includes an occupancy status or label for individual voxels based on a determined occupancy probability for such voxels. In examples, a ground truth dataset, including the occupancy status for individual voxels, may be generated or determined using an auto-labeling, simulated labeling, and/or human labeling techniques and/or systems.

The system may then use this ground truth dataset associated with the training dataset to determine a loss for the individual voxels in the training dataset based on a predicted occupancy for the individual voxels and the ground truth data associated with the individual voxels. For instance, a mean squared error (MSE) between the predicted occupancy probability and the ground truth occupancy data may be determined as a loss for individual voxels in the training dataset.

The system may further determine a weight to be applied to the loss for the individual voxels in the dataset. Initially, the weight for the individual voxels may be a same weight across the dataset. The system may determine a weight, or adjustment, for the loss associated with individual voxels based on one or more criteria. For example, for a particular voxel determined to be associated with an occupied space in the environment (e.g., determined to likely be occupied based on sensor data), the system may determine a number of other proximate or relatively spatially close voxels that are also occupied. The system may then determine a proportionate weight to apply to the loss for that particular voxel based on the quantity of proximate occupied voxels. For instance, the system may apply a greater weight to the loss (e.g., more significantly increase the loss) associated with a particular occupied voxel having fewer proximate occupied voxels. Alternatively, the system may apply a lesser weight or no weight to the loss (e.g., less significantly increase the loss or make no change to the loss) associated with a particular occupied voxel having many proximate occupied voxels.

To determine a weight based on the quantity of proximate occupied voxels, the system may evaluate various quantities of proximate voxels. For example, for a particular voxel, the system may determine a quantity of occupied voxels from among a number of the voxels about or surrounding the particular voxel (e.g., a number of voxels in a symmetrical three-dimensional voxel space with the particular voxel at the center of the space, for example, a 3×3×3 voxel space, a 7×7×7 voxel space, etc.). The number of the voxels surrounding the particular voxel evaluated for occupancy may be any quantity and may vary based on the voxel resolution. For instance, a greater number of surrounding voxels may be evaluated when an individual voxel represents a smaller space in an environment.

In this way, voxels that are associated with object protrusions may be given a greater loss, which may cause the model to attribute greater significance to such voxels. By increasing the significance attributed to such voxels by the model, the model may evaluate in more detail the various attributes and other data associated with the voxels in determining labels, classification, occupancy status, etc., for such voxels. This, in turn, may increase the accuracy of these determinations performed by the model and generated as model output.

For example, the model may take into account various other criteria, in addition to or instead of sensor data, in determining whether a voxel is associated with a particular object classification or label and/or otherwise occupied. For instance, the model may be trained to use a velocity and/or a direction of a particular voxel and the velocities of the proximate occupied voxels to determine whether the particular voxel and the proximate occupied voxels are associated with a same object. Voxels that are traveling in a similar direction at a similar velocity are more likely to be associated with the same object, whereas voxels traveling in a substantially different directions and/or at substantially different velocities are less likely to be associated with the same object. Acceleration and other motion-related attributes, as well as any other voxel attributes, may also, or instead, be used by a model to determine various model outputs. By taking into account the velocity, direction, and/or other voxel attributes, the model may generate more accurate voxel determination data (e.g., classification, label, occupancy status, etc.).

A machine-learned object detection model trained as described herein may be provided a voxelized dataset representing an environment, for example, by a vehicle computing system while executing at an autonomous vehicle. This dataset may include one or more types of sensor data (e.g., lidar, sonar, radar, vision) and/or other data associated with the environment. The model may process this dataset to determine occupancy and/or other data for the voxels in the dataset. For example, for those voxels in the dataset determined by the model to be occupied (e.g., sufficiently likely to be occupied based on the model-determined occupancy probability), the model may output the occupancy status for the voxel. The vehicle computing system may use this occupancy status to perform one or more operations, such as generating a trajectory for controlling a vehicle through the environment represented by the voxels.

Alternatively or additionally, the model may determine and output one or more labels or classifications for the voxels. For example, the model may determine one or more object labels for occupied voxels, such as vehicle, pedestrian, truck, non-impeding object, etc. The model may cluster voxels based on proximity, which may associate object protrusions with a larger object. A label may be associated with a probability of label accuracy, which may or may not accompany the output generated by the model. These labels may then be used to generate and/or update a vehicle trajectory and/or perform one or more other vehicle-related operations by the vehicle computing system.

In various examples, a machine-learned model trained as described herein may be executed using input from individual sensors (e.g., lidar, sonar, radar, vision) and/or one or more associated components. In various examples, a lidar perception system that may receive lidar data from one or more lidar sensors may also, or instead, execute a machine-learned model trained as described herein. In various examples, other perception systems that may receive other types of data (e.g., lidar, sonar, radar, vision) from one or more sensors may also, or instead, execute a machine-learned model trained as described herein. In various examples, one or more such machine-learned models trained as described herein may be executed by one or more such systems configured at a vehicle, such as an autonomous vehicle.

When a machine-learned model trained according to the disclosed techniques is executed in a vehicle computing system, the model may perform object determinations and labeling that may be used to control the vehicle. For example, based on the disclosed object determinations and labeling, the vehicle computing system may determine a vehicle trajectory that addresses an object that includes protrusions when planning a vehicle trajectory or adjusting a vehicle trajectory based on accounting for the object protrusions as potentially impeding the vehicle's motion. Any type of vehicle control may be implemented based on the out pout of a model trained as described herein to perform object determinations and/or labeling. For example, controlling the vehicle may include performing one or more of a braking action to cause the vehicle to brake, a steering action to cause the vehicle to steer, or an acceleration action to cause the vehicle to accelerate.

Additionally or alternatively, the output of a model trained as described herein may include, or may be used to generate, a confidence score associated with an object determination that may be provided to a planning component of the vehicle. In such an example, the planning component may use the confidence score as a cost, among multiple costs considered, in determining a trajectory for the vehicle.

The systems and techniques described herein may be directed to training and leveraging machine-learned models, lidar data, other types of sensor data, and associated data to improve object detection used by a vehicle, such as an autonomous vehicle, in an environment. More specifically, the disclosed systems and techniques may be directed to facilitating more accurate and complete detection of objects that may include protrusions. Using this improved data, such a vehicle may generate safer and more efficient trajectories for use in navigating through an environment. In particular examples, the systems and techniques described herein can utilize lidar and/or other sensor data training datasets to train machine-learned models to more accurately and efficiently determine the complete extents of objects in an environment. By using these models trained according to the disclosed examples, vehicle computing systems may more accurately distinguish the full contours of objects that may present a hazard to an autonomous vehicle. The examples described herein may result in increased certainty and accuracy in object detections, thereby allowing an autonomous vehicle to generate more accurate and/or safer trajectories for the autonomous vehicle to traverse in the environment.

For example, techniques described herein may increase the reliability of the determination of the extents of potentially impeding objects in the environment, reducing the likelihood of inaccurately designating an object as a non-impeding object. That is, the techniques described herein provide a technological improvement over existing object detection, classification, tracking, and/or navigation technology. In addition to improving the accuracy of object detections and classifications of such objects, the systems and techniques described herein can provide a smoother ride and improve safety outcomes by, for example, more accurately providing safe passage to an intended destination through an environment that is also occupied by one or more objects that may include protrusions. Moreover, the systems and techniques may prevent unnecessary braking or hard-braking to avoid object protrusions detected suddenly.

The techniques described herein may also improve the operation of computing systems and increase resource utilization efficiency. For example, computing systems, such as vehicle computing systems, may more efficiently perform object determinations using one or more machine-learned models trained according to the techniques described herein because, by proportionally weighting training data associated with object protrusions as described herein, the disclosed examples may reduce the amount of training time and manual training dataset labeling required to generate accurate machine-learned object detection models. The disclosed examples may also reduce the data processing required to determine and label objects having protrusions because the machine-learned models trained according to the disclosed examples may increase the accuracy of such determinations, thereby reducing the need to correct and/or adjust labeling by other systems and processes (e.g., consistency checking components) associated with vehicle computing systems. This reduction in extraneous processing therefore increases the overall efficiency of such systems over what would be possible using conventional techniques. Moreover, the techniques discussed herein may reduce the amount of data used by computing systems to determine and process object labels as the number of labels applied to various objects may be reduced due to improved initial object labeling, which may reduce latency, memory usage, power, time, and/or computing cycles required to detect and categorize objects detected in an environment.

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, although discussed in the context of pulses originating as lidar emissions, detection using lidar sensors, and processing using lidar sensors and lidar point data, other types of sensors and emitters are contemplated, as well as other types of sensor data (e.g., lidar, sonar, radar, vision). Furthermore, the disclosed systems and techniques may include using various types of components and various types of data and data structures, including, but not limited to, various types of image data and/or sensor data (e.g., stereo cameras, time-of-flight data, radar data, sonar data, and the like). For example, the techniques may be applied to any such sensor systems. Additionally, the techniques described herein can be used with real data (e.g., captured using sensor(s)), simulated data (e.g., generated by a simulator), or any combination of the two.

Figure 3:
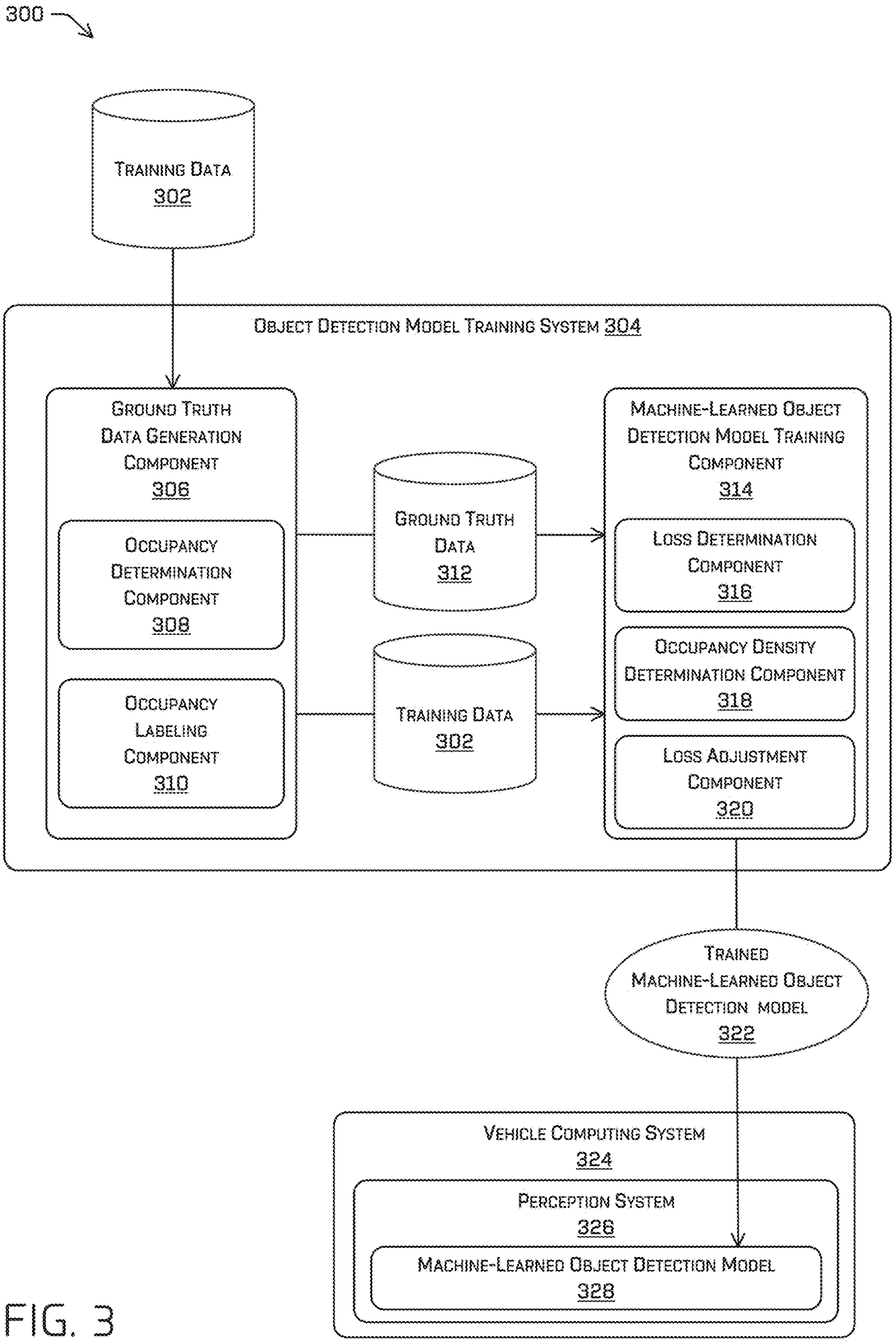
FIG. 3 is a block diagram of an example machine-learned object detection model training and distribution system and an example vehicle computing system including a perception system integrating a trained machine-learned object detection model, in accordance with examples of the disclosure.

FIG. 1 is a pictorial flow diagram of an example process 100 for training a machine-learned model to determine whether and how to label objects that may include object protrusions based on various criteria, such as sensor data representing an environment in which a vehicle may be operating. In some examples, one or more operations of the process 100 may be implemented by a vehicle computing system, such as by using one or more of the components and systems illustrated in FIGS. 3-5 and described below. For example, one or more components and systems can include those associated with one or more of the one or more sensor systems 424 and 506, one or more of the perception components 326, 426, and 522, and/or one or more of the planning components 422 and 528. In some examples, the one or more operations of the process 100 may also, or instead, be performed by a remote system in communication with a vehicle, such as by one or more components of the object detection model training system 304 illustrated in FIG. 3 and/or the perception component 544 and/or planning component 550 of the computing device(s) 538 illustrated in FIG. 5. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing systems. However, the process 100 is not limited to being performed by such components and systems, and the components and systems of FIGS. 3-5 are not limited to performing the process 100.

At operation 102, a training dataset may be received at a machine-learned model training and/or execution system (e.g., a vehicle computing system). In particular examples, this training dataset may include sensor data such as lidar data. The lidar data in such a training dataset may represent data determined by a lidar system that emitted one or more lidar pulses into an environment with one or more lidar emitters and detected one or more return pulses with one or more lidar sensors (e.g., photodetectors). The training dataset may also, or instead, include sensor data associated with other sensor types, such as radar data, sonar data, vision data, audio data, time-of-flight, etc. In examples, the training dataset may be voxelized data made up of one or more voxels that provide a three-dimensional representation of an environment. In other examples, the training dataset may be pixelized data made up of one or more pixels that provide a two-dimensional representation of an environment. Further at operation 102, ground truth data corresponding to the training dataset may be received at the system. This ground truth data may be a dense, annotated ground truth data representing the same environment as represented by the training dataset.

An example 104 illustrates an example environment that may be represented by such training data and ground truth data that may be determined and/or generated based on the training data. Note that while the example 104 provides a top-down view of the environment, the training dataset may be three-dimensional voxelized data. As shown in the example 104, various objects may be present in the environment. For example, a vehicle 108 and a truck 110 may be configured on a roadway. There may also be a forklift 112 that is also configured on the roadway. As shown here, the forklift 112 may include protrusions 114 that may be the forklift's forks. A pedestrian 116, a bird 118, and steam 120 may also be present in this example environment.

At operation 122, the system may determine a density of proximate occupied voxels for the individual occupied voxels of the dataset, for example, using occupancy labels associated with the individual voxels as presented in gourd truth data. In examples, the system may determine a quantity or portion of voxels surrounding a particular occupied voxel that are also occupied (e.g., have a sufficient occupancy probability). For example, for a particular voxel, the system may determine a quantity of occupied voxels from among a number of the voxels surrounding the particular voxel with the particular voxel at the center. The number of surrounding voxels may be an equal number in each dimension, such as a 3×3×3 voxel space, a 5×5×5 voxel space, a 7×7×7 voxel space, etc., in three dimensions with the particular voxel at the center. As noted above, the number of the voxels surrounding the particular voxel evaluated for occupancy may be any quantity and may vary based on the voxel resolution. For instance, a greater number of surrounding voxels may be evaluated when an individual voxel represents a smaller space in an environment.

At operation 124, the system may determine a weight adjustment to be applied to the loss for individual occupied voxels. In examples, the system may determine an applicable weight adjustment based on the density of proximate occupied voxels as determined at operation 122. For instance, the system may determine a weight inversely proportionate to the quantity or portion of proximate voxels that are occupied. In a specific example, a particular occupied voxel may be the center voxel of a 3×3×3 (27 voxel) kernel of voxels (e.g., a symmetrical three-dimensional voxel space). Among the surrounding 26 voxels, three may have a sufficient probability of being occupied. Based on this 3/26 occupied fraction of proximate voxels, the system may set the weight for this particular occupied voxel at the center of this kernel of voxels relatively high. In another specific example, a particular occupied voxel may be the center voxel of a 3×3×3 (27 voxel) kernel of voxels where, among the surrounding 26 voxels, 23 may have a sufficient probability of being occupied. Based on this occupied fraction of proximate voxels (e.g., 23/26 in this example), the system may set the weight for this particular occupied voxel at the center of this kernel of voxels relatively low or at zero. In examples, a weight for an individual voxel may be any value (e.g., zero or greater, between 0 and 1 inclusive, etc.) with a default or initial weights being one. In such examples, the weight may be applied to loss multiplication, that is, a default weight of one does not change the loss (e.g., 1× loss), while an increased weight does change the loss (e.g., 1.85× lox, 2.2× loss, etc.).

An example 126 illustrates the example environment of example 104 with representative voxel densities. As shown here, the voxels representing the object in example 104 may be of varying densities depending on the type of object and/or the portion of the object represented by such voxels. For instance, the voxels representing the vehicle 108 may be densely located at the space indicated as dense occupied voxels 128, the voxels representing the truck 110 may be densely located at the space indicated as dense occupied voxels 130, and the voxels representing the pedestrian 116 may be densely located at the space indicated as dense occupied voxels 136. Some objects may be associated with sparsely located voxels, such as the voxel representing the bird 118 that may be located at the space indicated as sparse occupied voxel 138 and the voxels representing the steam 120 that may be located at the space indicated as sparse occupied voxels 140.

Some objects in an environment may simultaneously have one or more portions that may be represented by densely located voxels and one or more portions that may be represented by sparsely located voxels. For example, as shown in the example 126, the voxels representing the body of the forklift 112 may be densely located at the space indicated as dense occupied voxels 132, while the voxels representing the protrusions 114 (forks of the forklift 112) may be sparsely located at the space indicated as sparse occupied voxels 134.

At operation 142, the system may determine a loss for individual voxels of the voxelized training dataset received at operation 102. In examples, the system may initially determine an occupancy probability for individual voxels in the training dataset, for example, based on sensor data represented by the individual voxel. The system may then use the ground truth data received and/or determined at operation 102, which may include occupancy labels corresponding to the individual voxels, to determine a loss for the individual voxels. In examples, this system may determine the MSE between the occupancy probability for the individual voxels and the corresponding ground truth data as the loss for the individual voxels.

At operation 144, the system may use the determined weights to adjust the loss at the individual occupied voxels (if a non-zero weight is to be applied). This may include generating an updated loss-adjusted training dataset or modifying the training dataset to update the loss values for the individual voxels.

At operation 146, the system may use the loss-adjusted training dataset to train a machine-learned object detection model to determine occupancy and/or labels for voxels in a dataset. In examples, the system may further train a model to determine detection boxes, contours, or other indications of extents of objects detected in a dataset. The model may be trained to perform such determinations based on clustering of voxels and determining voxel associations based on sensor data and other voxel data, such as direction, velocity, acceleration, etc.

An example 148 illustrates the example environment of example 104 with representative object label and extent determination that may be performed by a machine-learned object detection model trained as described herein (e.g., according to the previously described operations of process 100). Processing a dataset representing the environment of the example 104, and referring to the voxels illustrated in the example 126, such a model may label the dense occupied voxels 128 representing the vehicle 108 as a vehicle 150 and may associate the extents of the vehicle 150 with the outermost voxels of the dense occupied voxels 128. Similarly, the model may label the dense occupied voxels 130 representing the truck 110 as a truck 152 and may associate the extents of the truck 152 with the outermost voxels of the dense occupied voxels 130. The model may further label the dense occupied voxels 136 representing the pedestrian 116 as a pedestrian 156 and may associate the extents of the pedestrian 156 with the outermost voxels of the dense occupied voxels 130.

Regarding the sparse occupied voxels, the model may label the sparse occupied voxel 138 representing the bird 118 as a non-impeding object 158. The model may also individually label the sparse occupied voxels 140 representing the steam 120 as a non-impeding objects 160. For these non-impeding objects, the model may be configured to individually label the voxels without determining extents of an associated object. Alternatively or additionally, the model may be configured to determine associated object extents and associate such extents with the individual non-impeding object voxels.

The model may be further configured to process sparse occupied voxels that represent protrusion from larger objects. For example, the model may be configured to determine that the sparse occupied voxels 134 representing the protrusions 114 of the forklift 112 may be associated with the forklift 112 body as represented by the dense occupied voxels 132. For instance, the model may determine that the voxels 132 and 134 have similar velocities and directions (and, in some examples, may determine that these voxels are sufficiently proximate). Based on these determinations, the model may determine that the voxels 132 and 134 are associated with the same object. The model may further determine that the appropriate label is a vehicle label and may therefore label the sparse occupied voxels 134 and the dense occupied voxels 132 as a vehicle 154. The model may further associate the extents of the vehicle 154 with the outermost voxels of the dense occupied voxels 132 combined with the sparse occupied voxels 134, as shown in this example.

Figure 2:
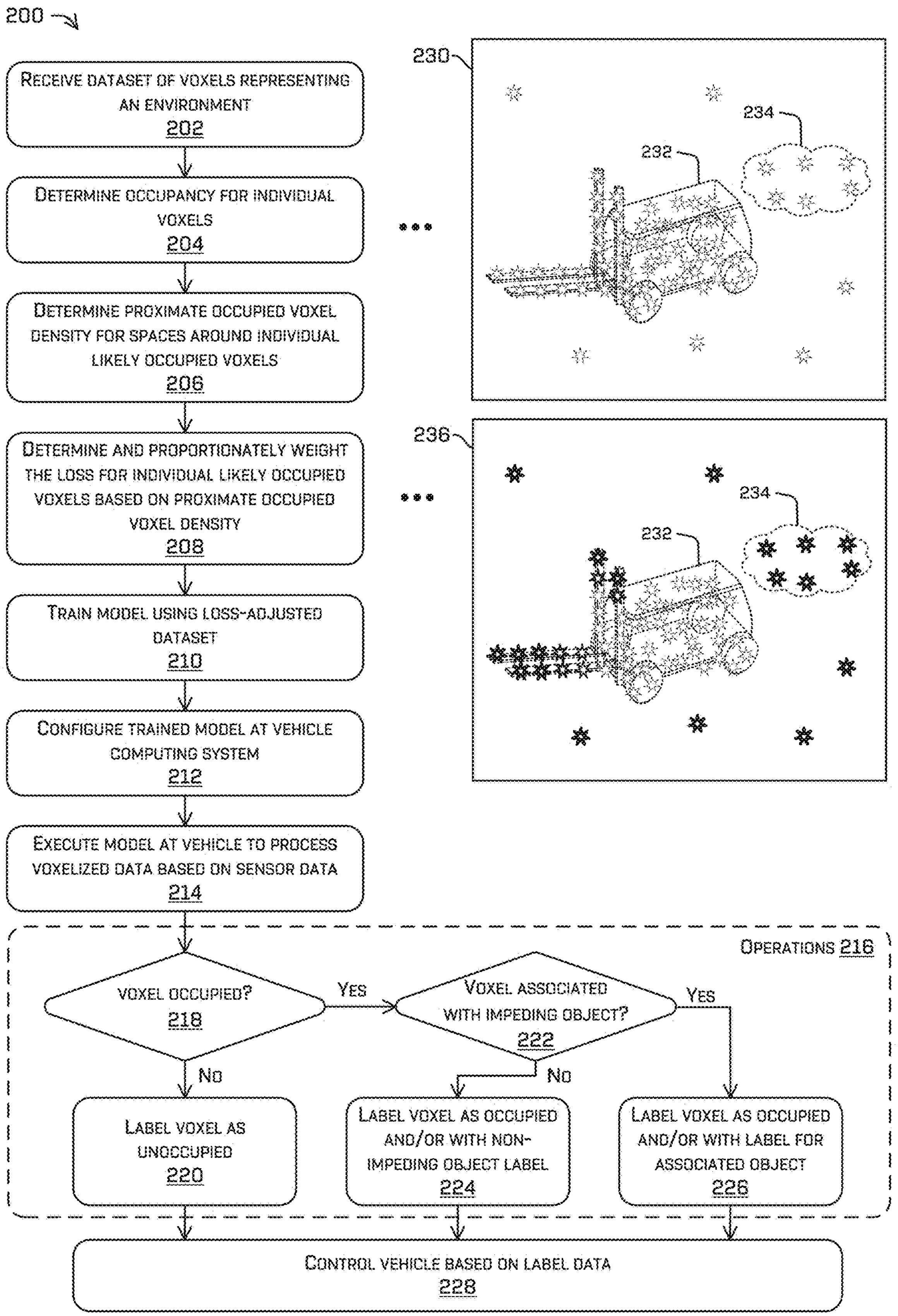
FIG. 2 is a flow diagram of an example process determining an object classification and occupancy status for detection data based on data representing an environment, in accordance with examples of the disclosure.

FIG. 2 is a flow diagram of an example process 200 for training a machine-learned model to determine and label voxels based on various criteria. In some examples, one or more operations of the process 100 may be implemented by a vehicle computing system, such as by using one or more of the components and systems illustrated in FIGS. 3-5 and described below. For example, one or more components and systems can include those associated with one or more of the one or more sensor systems 424 and 506, one or more of the perception components 326, 426, and 522, and/or one or more of the planning components 422 and 528. In some examples, the one or more operations of the process 100 may also, or instead, be performed by a remote system in communication with a vehicle, such as by one or more components of the object detection model training system 304 illustrated in FIG. 3 and/or the perception component 544 and/or planning component 550 of the computing device(s) 538 illustrated in FIG. 5. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing systems. However, the process 100 is not limited to being performed by such components and systems, and the components and systems of FIGS. 3-5 are not limited to performing the process 100.

At operation 202, a dataset may be received at a machine-learned model training and/or execution system (e.g., a vehicle computing system). The dataset may include data representing an environment. In particular examples, this dataset may include sensor data of any type collected from an environment (or otherwise representing an environment). This dataset may further include other data based on sensor data associated with the environment and/or other data associated with the environment. The dataset may be voxelized data made up of one or more voxels that provide a three-dimensional representation of the environment.

At operation 204, the system may determine an occupancy or occupancy status for individual voxels in the dataset. In examples, the system may determine an occupancy status for a particular voxel based on ground truth data associated with the voxel (e.g., an occupancy label in ground truth data corresponding to the voxel). This occupancy status or label may be determined based on whether an occupancy probability for the voxel is at or above a threshold occupancy probability value. If so, the voxel may be determined to be "occupied," while those voxels having an occupancy probability below the threshold occupancy probability value may be "unoccupied."

An example 230 illustrates a subset of voxels (shown as stars) that may be included in a dataset such as that received at operation 202. These voxels may be determined to be occupied voxels and may have (e.g., as default or initial weighting) a same or no loss weighting (e.g., illustrated here as the same line emphasis (width) across the voxel stars). In this example, some of the occupied voxels may be associated with particular objects in an environment represented by the associated dataset. For example, a forklift 232 may be represented by occupied voxels as well as smoke 234. Various other occupied voxels are represented here as well, which may represent small objects in the environment and/or sensor noise.

At operation 206, the system may determine a proximate occupied voxel density for spaces around individual occupied voxels. For example, the system may determine a proximate occupied voxel density value representing a quantity, percentage, portion, etc., of voxels surrounding a particular occupied voxel that are also occupied (e.g., have a sufficient occupancy probability). For example, for a particular voxel, the system may determine a quantity of occupied voxels from among a number of voxels surrounding the particular voxel, where the particular voxel is at the center. The number of surrounding voxels may be an equal number in each dimension of a voxel space or kernel. For instance, such a kernel may be a 3×3×3 voxel space, a 5×5×5 voxel space, a 7×7×7 voxel space, etc. The particular voxel may be at the center of this kernel. In examples, the number of the voxels in a kernel may be any quantity and may vary based on the voxel resolution. For instance, a larger kernel with a greater number of voxels may be evaluated when an individual voxel represents a smaller space in an environment (e.g., higher resolution voxels).

At operation 208, the system may determine a loss for individual occupied voxels (e.g., based on ground truth data) and apply a weight to the loss based on the proximate occupied voxel density value. This weight may be inversely proportional to the proximate occupied voxel density value (e.g., the greater the proximate occupied voxel density value, the less the weight and vice versa). In this way, voxels with fewer proximate occupied voxels may be given a greater loss, which may, in turn, cause a model to attribute greater significance to such voxels during training, as described above.

An example 236 illustrates the subsets of voxels (shown as stars) from the example 230 that may have been included in the dataset received at operation 202. The voxels in the example 236 may be loss-adjusted based on their respective determined proximate occupied voxel density values. As shown in this example, the line emphasis illustrated for the individual occupied voxels is inversely proportional to the associated proximate occupied voxel density values (e.g., greater line width for smaller proximate occupied voxel density values and vice versa). As seen here, the individual voxels representing the forks of the forklift 232 may have a lower proximate occupied voxel density value (and therefore greater line emphasis), along with other voxels having relatively lower proximate occupied voxel density value, such as those associated with the smoke 234 and various other occupied voxels representing small objects and/or sensor noise. As may also be seen here, the individual voxels representing the body of the forklift 232 may have a higher proximate occupied voxel density value (and therefore lower line emphasis).

Using the dataset with these loss-adjusted voxels (or another dataset generated based on the loss-adjusted voxels) as training data, at operation 210, the system may train an object detection model to more accurately detect object, including object with one or more object protrusions.

At operation 212, the trained object detection model may be configured at a vehicle, for example at or in communication with a vehicle computing system. The vehicle computing system may execute the trained object detection model at operation 214 to process voxelized data representing an environment to determine object detections and related object data for individual voxels in the voxelized data representing the environment. The model may generate output representing these determinations that the vehicle computing system may use to control the vehicle and/or otherwise perform vehicle-related operations. For example, the vehicle computing system may generate one or more vehicle trajectories based on object detection output generated by a trained object detection model.

For example, a trained object detection model may be executed by a vehicle computing system to perform operations 216 for individual voxels of voxelized data representing an environment. While the operations 216 are described for individual voxels, the model may be executed using voxelized data representing an environment as input and may process some or all of the individual voxels in the voxelized data using operations 216.

At operation 218, for an individual voxel of voxelized data representing an environment and received as input, an object detection model trained as described herein may determine if the voxel is occupied (e.g., has an occupancy probability meeting or exceeding an occupancy probability threshold value). If the model determines that the voxel is not occupied (e.g., has an occupancy probability below the occupancy probability threshold value), at operation 220, the model may label or otherwise generate model output indicating that the voxel is unoccupied.

If, at operation 218, the model determines that an individual voxel is occupied, at operation 222, the model may determine whether the individual voxel is associated with an impeding object. For example, the model may determine a classification or object label for the voxel, in examples, based on data associated with other voxels in the input data. The model may determine whether this label or classification is associated with an impeding object (e.g., an object that may impede the movement of the vehicle or otherwise need to be accounted for in determining and performing vehicle operations).

If, at operation 222, the voxel is determined to not be associated with an impeding object, at operation 224, the voxel may be labeled with a non-impeding object label and/or as occupied. Alternatively or additionally, the model may otherwise generate output indicating that the voxel is associated with a non-impeding object and/or is occupied by a physical object.

If, at operation 222, the voxel is determined to be associated with an impeding object, at operation 226, the voxel may be labeled with an impeding object label (e.g., vehicle, truck, pedestrian, etc.) and/or as occupied. Alternatively or additionally, the model may otherwise generate output indicating that the voxel is associated with an impeding object label and/or is occupied by a physical object.

The model output, as determined as any of operations 220, 224, or 226, may be provided to the vehicle computing system and used for vehicle control operations at operation 228. For instance, the vehicle computing system may use this output to determine one or more vehicle trajectories, predict one or more object movements, plan one or more vehicle routes, etc.

FIG. 3 is a block diagram of an example machine-learned object detection model training and distribution system 300 according to various examples. The system 300 may be implemented at a vehicle (e.g., an autonomous vehicle) by a vehicle computing system and may include one or more of the components and systems illustrated in FIGS. 4-5 and described below. For example, one or more components and systems can include those associated with one or more of the one or more sensor systems 424 and 506, one or more of the perception components 426 and 522, and/or one or more of the planning components 422 and 528. In some examples, the one or more operations of the process 100 may also, or instead, be performed by a remote system in communication with a vehicle, such as by the perception component 544 and/or planning component 550 of the computing device(s) 538 illustrated in FIG. 5. In still other examples, one or more operations of the system 300 may be implemented as a combination of a components at a remote system and a vehicle computing system. However, the system 300 is not limited to being performed by such components and systems, and the components and systems of FIGS. 4 and 5 are not limited to implementing the system 300.

Training data 302 may be generated, determined, received, and/or provided to an object detection model training system 304. In various examples, this data may represent data collected in an environment by a vehicle configured with one or more sensors of any type. The data 302 may include sensor data and/or any other type of data associated with an environment, including any data generated based on sensor data associated with such an environment. In examples, the training data 302 may be voxelized with individual voxels representing sensor data (e.g., lidar data, radar data, vision data, audio data, etc.), as well as other data that may be associated with objects represented by sensor data, such as velocity, acceleration, and direction. In some examples, the training data 302 may include occupancy status probability (e.g., for individual voxels included therein), while in other examples, the system may determine occupancy data for the training data 302 as described herein.

The object detection model training system 304 may be configured with a ground truth data generation component 306. The object detection model training system 304 may provide the training data 302 to the ground truth data generation component 306 to for use in generating corresponding ground truth data. For example, the ground truth data generation component 306 may include an occupancy determination component 308 that may determine, for individual voxels of the training data 302, an ground truth occupancy status. In examples, this may be performed using an auto-labeling, simulated labeling, and/or human labeling techniques and/or systems. The ground truth data generation component 306 may also include an occupancy labeling component 310 that may generate labels for the individual voxels based on the occupancy determination performed by the occupancy determination component 308. This ground truth data including individual voxel occupancy labels may be provided as ground truth data 312 to a machine-learned object detection model training component 314. The training data 302 may also be provided to the machine-learned object detection model training component 314.

The machine-learned object detection model training component 314 may include a loss determination component 316 that may be configured to determine a loss of individual voxels (or other data units) of the training data 302 using the ground truth data 312. For instance, the loss determination component 316 may compare data values in the training data 302 to corresponding data values in the ground truth data 312 to determine a difference between such values. The loss determination component 316 may then store such differences as loss values for the associated individual voxels or other data units or otherwise use such differences to generate loss values for the associated individual voxels or other data units.

The machine-learned object detection model training component 314 may further include an occupancy density determination component 318. The occupancy density determination component 318 may determine, for individual voxels in the training data 302 that have been determined to be occupied based on the ground truth data 312, a proximate occupied voxel density for spaces around such individual occupied voxels. For example, the occupancy density determination component 318 may determine a proximate occupied voxel density value for individual voxels that have been determined to be occupied. This proximate occupied voxel density value may represent a quantity, percentage, portion, etc., of the surrounding voxels that are also occupied (e.g., have a sufficient occupancy probability). As described herein, a three-dimensional voxel space, or kernel, at the center of which a particular individual occupied voxel may be located, may be evaluated for occupied voxel density. The number of voxels surrounding the particular individual occupied voxel at the center of the kernel may be an equal number in each dimension. For instance, a kernel may be a 3×3×3 voxel space, a 5×5×5 voxel space, a 7×7×7 voxel space, etc. As noted, the number of voxels in a kernel may be any quantity and may vary based on the voxel resolution and/or other criteria.

The machine-learned object detection model training component 314 may further include a loss adjustment component 320. The loss adjustment component 316 may adjust the loss as determined by the loss determination component 316 for individual voxels (or other data units) of the training data 302 based on the proximate occupied voxel density value determined for that voxel or data unit (e.g., by the occupancy density determination component 314). For example, the loss adjustment component 316 may determine a weight to apply to loss values that may be inversely proportionate to the proximate occupied voxel density value (e.g., the lower the proximate occupied voxel density value, the greater the weight, and vice versa). The loss adjustment component 316 may then add a determined weight for the individual voxels to the loss value for voxels as determined by the loss determination component 316.

In examples, the machine-learned object detection model training component 314 may use this loss-adjusted training data (e.g., with adjusted loss values as determined at the loss adjustment component 320 based on the losses determined at the loss determination component 316 and the proximate occupied voxel density values determined at the occupancy density determination component 318) in training a machine-learned object detection model. The object detection model training system 304 may train a machine-learned model to generate a trained machine-learned object detection model 322 to perform object detection, for example, as decided herein.

The trained machine-learned object detection model 322 may be transmitted or otherwise configured at a vehicle computing system 324. The vehicle computing system 324 may be configured at a vehicle, such as an autonomous vehicle, for performing vehicle control and/or other vehicle-related operations.

In examples, the trained machine-learned object detection model 322 may be configured at a perception system 326 of the vehicle computing system 324 as a machine-learned object detection model 328. The machine-learned object detection model 328 may be executed by the vehicle computing system 324 to perform object detections and/or other operations as described herein.

Figure 4A:
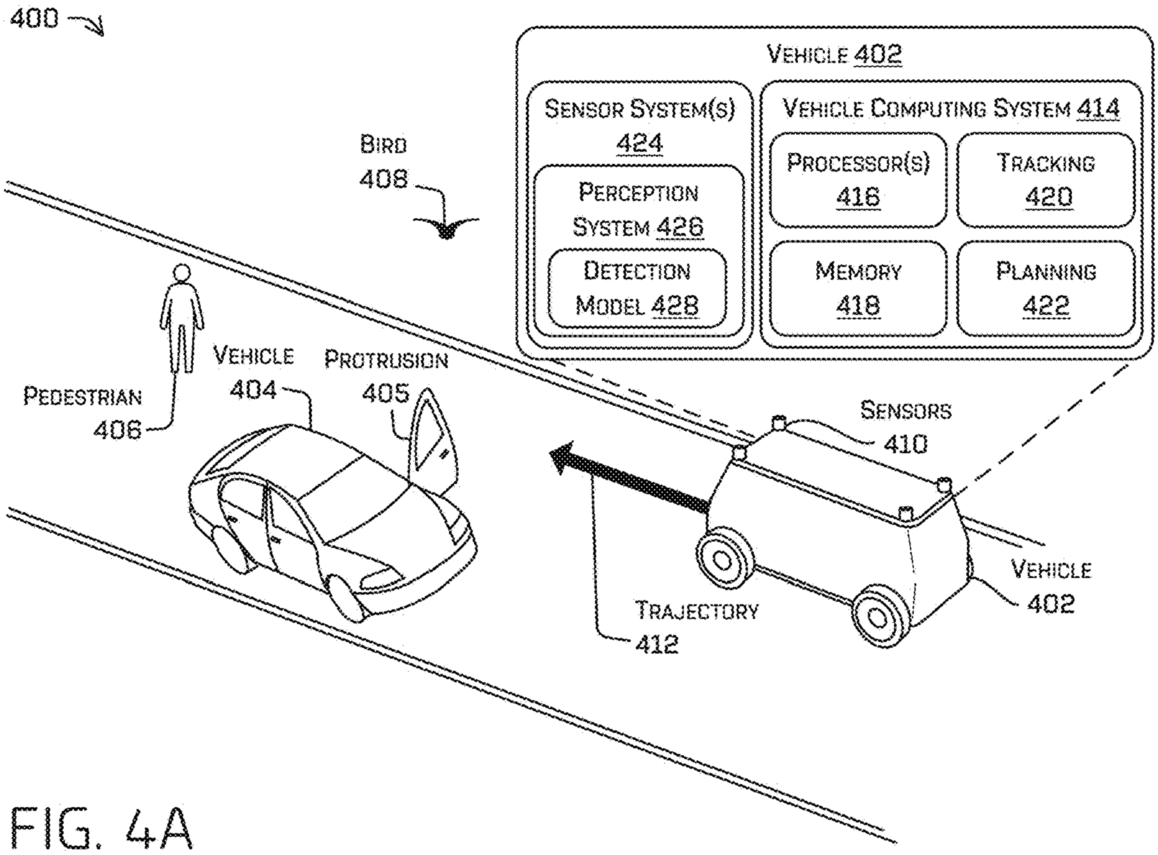
FIG. 4A is a diagram of an example environment in which a vehicle may encounter object protrusions and/or non-impeding objects as represented by data collected in an environment, in accordance with examples of the disclosure.
Figure 5:
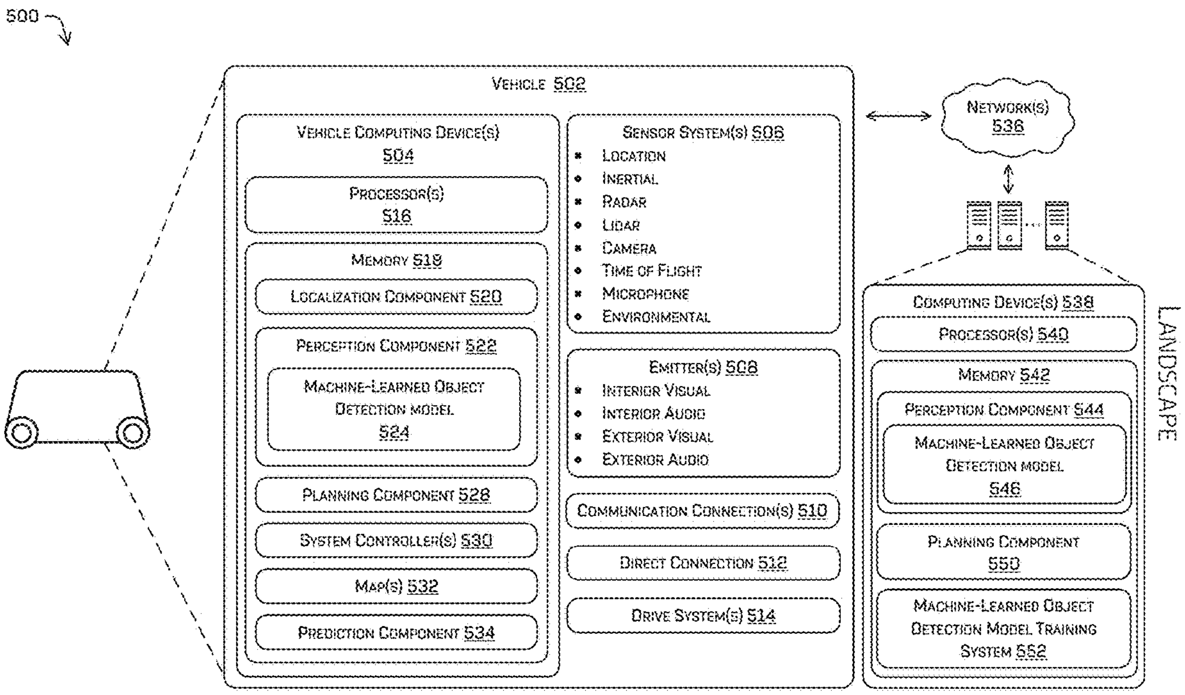
FIG. 5 is a block diagram of an example system for implementing the techniques described herein.

FIG. 4A is a perspective view of an example environment 400 in which a vehicle 402 may be traveling. The vehicle 402 may be configured with one or more sensor systems 424 that may include a perception system 426. The sensor system(s) 424 may include emitters/sensors 410 that may be any one or more types of sensors. For example, the emitters/sensors 410 may be configured to emit one or more lidar pulses into the environment 400 and detect one or more return lidar pulses resulting from reflections of the lidar pulses emitted into the environment 400. The sensor system may be configured to provide sensor data to the perception system 426. Using this sensor data and/or data that may be generated based thereon as input, the perception system may execute a detection model 428 to detect and/or otherwise determine object data for objects in the environment 400. The detection model 428 may be a machine-learned object detection model trained and/or configured as described herein (such as for example, trained machine-learned object detection model 322). The vehicle 402 may further be configured with a vehicle computing system 414 that may include one or more processors 416, a memory 418 a tracking component 420, and a planning component 422, any one or more of which may be used to perform one or more of the operations described herein.

The environment 400 may include various objects that may have surfaces that may have reflected lidar pulses and/or other emissions emitted by the emitters/sensors 410, resulting in the determination of various types of sensor detection points within the environment 400. For example, a vehicle 404 may be traveling on the same roadway as the vehicle 402. An object protrusion 405 may be an open door of the vehicle 404. A pedestrian 406 may also be in the roadway (e.g., crossing the street). A bird 408 may be flying by.

The vehicle computing system 414 may use the planning component 422 to determine a trajectory for the vehicle 402 based on the objects determined using the perception system 426. Initially, the vehicle 402 may be traveling along the roadway based on the trajectory 412.

The perception system 426 may generate, based on sensor detection points received from the sensor system(s) 424, a voxelized dataset representing the environment 400 and/or determined attributes and/or other data associated with the environment 400, including data associated with the objects 404, 405, 406, and 408. The perception system 426 may execute the detection model 428 using this voxelized dataset as input to generate object determination output, such as occupancy status data, label data, classification data, etc., for individual voxels of the voxelized dataset. The perception system 426 may provide this output data to one or more components of the vehicle computing system 414 for use in determining vehicle controls, such as trajectories.

Figure 4B:
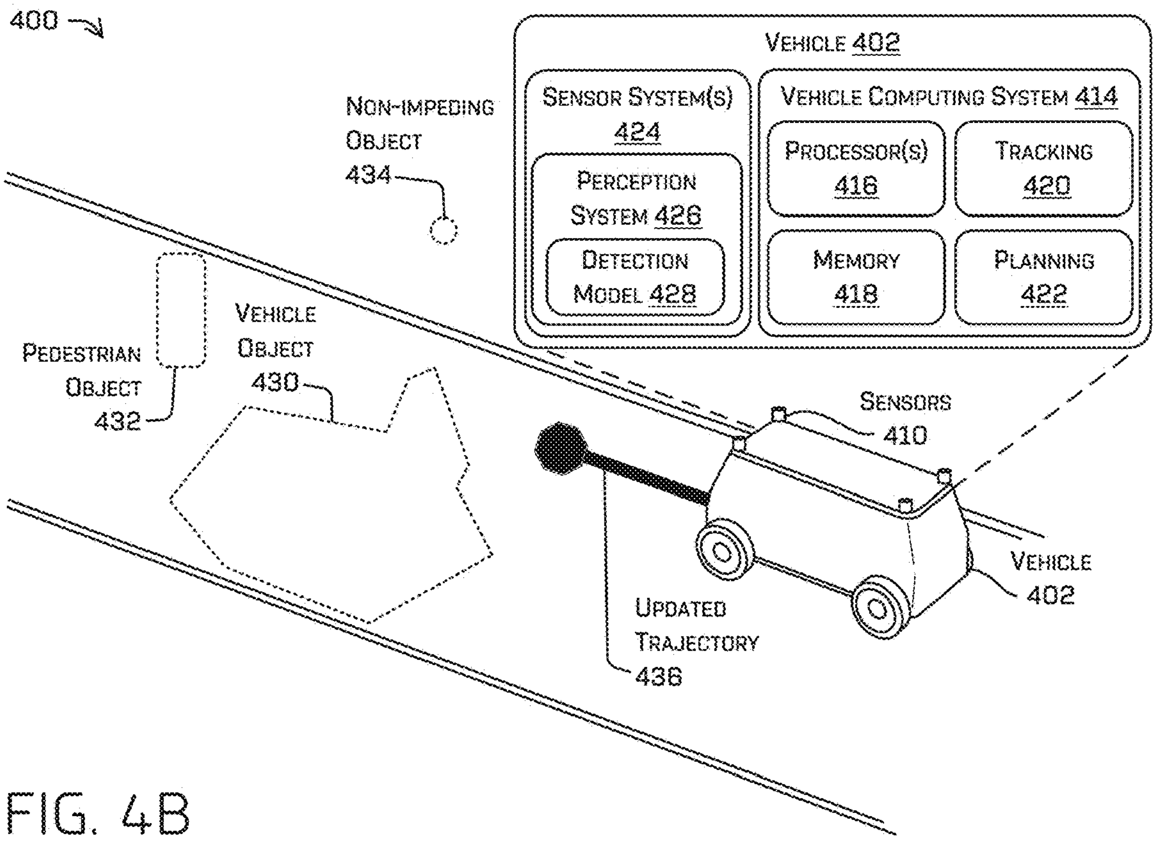
FIG. 4B is a diagram of the example environment of FIG. 4A in which the vehicle may determine a classification for detections points in an environment and object contours objects based on data collected in an environment, in accordance with examples of the disclosure.

For example, referring now to FIG. 4B providing another perspective view of the example environment 400, the perception system 426 may execute the detection model 428 using data representing the objects 404, 405, 406, and 408 to generate output that includes occupancy status data, label data, classification data, and/or other data associated with these objects represented in individual voxels of the output data. As shown in this figure, the detection model may determine that voxels representing the vehicle 404, including voxels representing the object protrusion 405 that is the vehicle 404's open car door, may be classified or labeled as occupied and/or as a vehicle object 430. The perception system 426 and/or the detection model 428 may further determine a contour, detection box, and/or other representation of the space occupied by the vehicle 404. Alternatively or additionally, the planning component 422 may use the classification, label, and/or other data associated with these voxels to determine a contour, detection box, and/or other representation of the space occupied by the vehicle 404.

Similarly, the detection model may determine that voxels representing the pedestrian 406 may be classified or labeled as occupied and/or as a pedestrian object 432. The perception system 426 and/or the detection model 428 may further determine a contour, detection box, and/or other representation of the space occupied by the pedestrian 406. The detection model may further determine that the one or more voxels representing the bird 408 may be classified or labeled as occupied and/or as a non-impeding object 434. The perception system 426 and/or the detection model 428 may also determine a contour, detection box, and/or other representation of the space occupied by the bird 408. Alternatively or additionally, the planning component 422 may use the classification, label, and/or other data associated with these voxels to determine a contour, detection box, and/or other representation of the space occupied by the pedestrian 406 and the bird 408.

The vehicle computing system 414 may use the planning component 422 to update the trajectory 412 for the vehicle 402 based on the objects and/or object data determined using the detection model 428 as executed by the perception system 426. Using this detection model 428 output, the planning component 422 may generate an updated trajectory 436 for controlling the vehicle 402. For example, the planning component 422 may generate the updated trajectory 436 to stop the vehicle 402 before encountering the space associated with the object protrusion 405 (car door of the vehicle 404) as represented by the contour associated with the vehicle object 430. The planning component 422 may also, or instead, generate the updated trajectory 436 to steer the vehicle 402 around the space associated with the object protrusion 405 as represented by the contour associated with the vehicle object 430.

The vehicle computing system 414 may also, or instead, use the output data generated by the detection model 428 to generate one or more tracks for potentially impeding objects in the environment 400. For example, the vehicle computing system 414 may use the tracking component 420 to generate a track (e.g., predicted path of travel within the environment 400) for the pedestrian 406 based on the output data associated with the pedestrian object 432 generated by the detection model 428. The tracking component 420 may not generate a track (e.g., predicted path of travel within the environment 400) for the bird 408 based on the output data associated with the non-impeding object 434 generated by the detection model 428 because the non-impeding object classification or label indicates to the tracking component that the associated object will not impede or otherwise interfere with the motion of the vehicle 402.

In examples, the tracking component 420, and/or data generated by the tracking component 420, may be used to generate the updated trajectory 436. For example, if the tracking component 420 predicts that the pedestrian 406 is likely to cross the path of the vehicle 402, this predicted pedestrian track may be used to generate the updated trajectory 436 such that the vehicle will stop before encountering the pedestrian 406.

FIG. 5 depicts a block diagram of an example system 500 for implementing the techniques described herein. In at least one example, the system 500 may include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522 that may include a machine-learned object detection model 524 that may be trained and/or otherwise configured to perform one or more of the machine-learned model operations described herein, a planning component 528, one or more system controllers 530, one or more maps 532, and a prediction component 534. Though depicted in FIG. 5 as residing in memory 518 for illustrative purposes, it is contemplated that any one or more of the localization component 520, the perception component 522, the machine-learned object detection model 524, the planning component 528, the one or more system controllers 530, the one or more maps 532, and the prediction component 534 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification, in addition to, or instead of, object labeling and machine-learned model operations as described herein. For example, the perception component 522 may include functionality to analyze lidar data and/or other sensor data to generate a voxelized dataset representing an environment that may be used as input to the machine-learned object detection model 524, as described herein. In some examples, the perception component 522 may provide processed sensor data (including, in examples, output generated by the machine-learned object detection model 524) that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, small, dynamic, non-impeding object, occupied space, unknown). In additional or alternative examples, the perception component 522 can provide processed sensor data that indicates one or more characteristics associated with a detected entity (e.g., a tracked object) and/or the environment in which the entity is positioned.

The perception component 522 may use the multichannel data structures as described herein, such as the voxel data structures generated by the described voxelization process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation (e.g., a small, dynamic, non-impeding object designation), occupancy status, intensity, etc. Such entity characteristics may be represented in a data structure as described herein (e.g., a voxel data structure generated as output of one or more voxelization operations, a two-dimensional grid of cells containing data, etc.). Characteristics associated with the environment can include, but are not limited to, a presence of another entity in the environment, a state of another entity in the environment, a time of day, a day of a week, a season, a weather condition, an indication of darkness/light, etc. In some examples, the perception component 522 can provide processed return pulse data as described herein.

In general, the planning component 528 can determine a path for the vehicle 502 to follow to traverse through an environment. In some examples, the planning component 528 can determine various routes and trajectories and various levels of detail. For example, the planning component 528 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 530, which can be configured to control steering, propulsion, braking, safety, emitters, communication, and other systems of the vehicle 502. These system controller(s) 530 may communicate with and/or control corresponding systems of the drive system(s) 514 and/or other components of the vehicle 502.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to, texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 532 can include at least one map (e.g., images and/or a mesh). In some examples, the vehicle 502 can be controlled based at least in part on the maps 532. That is, the maps 532 can be used in connection with the localization component 520, the perception component 522, and/or the planning component 528 to determine a location of the vehicle 502, identify objects in an environment, and/or generate routes and/or trajectories to navigate within an environment.

In some examples, the one or more maps 532 can be stored on a remote computing device(s) (such as the computing device(s) 538) accessible via network(s) 536. In some examples, multiple maps 532 can be stored based on, for example, a characteristic (e.g., type of entity, time of day, day of week, season of the year). Storing multiple maps 532 can have similar memory requirements but increase the speed at which data in a map can be accessed.

In general, the prediction component 534 can generate predicted trajectories of objects in an environment. For example, the prediction component 534 can generate one or more predicted trajectories for vehicles, pedestrians, animals, and the like within a threshold distance from the vehicle 502. In some instances, the prediction component 534 can measure a trace of an object and generate a trajectory for the object based on observed and predicted behavior. In some examples, the prediction component 534 can use data and/or data structures (e.g., output from the machine-learned object detection model 524) based on return pulses as described herein to generate one or more predicted trajectories for various mobile objects in an environment. In some examples, the prediction component 534 may be a sub-component of perception component 522.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN) that may have one or more convolution/deconvolution layers. Such a CNN may be a component of and/or interact with the machine-learned object detection model 524.

An example neural network is an algorithm that passes input data through a series of connected layers to produce an output. Individual layers in a neural network can also comprise another neural network or can comprise any number of layers, and such individual layers may be convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time-of-flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504. Alternatively or additionally, the sensor system(s) 506 can send sensor data, via the one or more networks 536, to the one or more computing device(s) 538 at a particular frequency, after a lapse of a predetermined period of time, in near real-time, etc.

In some examples, the sensor system(s) 506 can include one or more lidar systems, such as one or more monostatic lidar systems, bistatic lidar systems, rotational lidar systems, solid-state lidar systems, and/or flash lidar systems. In some examples, the sensor system(s) 506 may also, or instead, include functionality to analyze pulses and pulse data to determine intensity, drivable region presence, and/or other data as described herein.

The vehicle 502 can also include one or more emitters 508 for emitting light (visible and/or non-visible) and/or sound. The emitter(s) 508, in an example, include interior audio and visual emitters to communicate with passengers of vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter (s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short-range wireless frequencies such as Bluetooth, cellular communication (e.g., 2G, 3G, 4G, 4G LTE, 5G, 6G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc., between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., data representing return pulses, output generated by the machine-learned object detection model 524, etc.) to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing a planning component 550 and/or a perception component 544 that may include machine-learned object detection model 546 that may be configured to perform one or more of the machine-learned model operations described herein. In some instances, the perception component 544 can substantially correspond to the perception component 522 and can include substantially similar functionality. In some instances, the planning component 550 can substantially correspond to the planning component 528 and can include substantially similar functionality. The computing device(s) 538 (e.g., configured in the memory 542) may also include a machine-learned object detection model training system 552 that may be configured to train, configure, and/or distribute a machine-learned object detection model as described herein.

The processor(s) 516 of the vehicle 502 and the processor(s) 540 of the computing device(s) 538 can be any suitable one or more processors capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 542 are examples of non-transitory computer-readable media. The memory 518 and 542 may store an operating system and one or more software applications, instructions, programs, and/or data to implement the techniques and operations described herein and the functions attributed to the various disclosed systems. In various implementations, the memory 518 and 542 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

EXAMPLE CLAUSES

The following paragraphs describe various examples. Any of the examples in this section may be used with any other of the examples in this section and/or any of the other examples or embodiments described herein.

A: A system comprising one or more processors; and one or more non-transitory computer-readable media storing instructions executable by the one or more processors, wherein the instructions, when executed, cause the system to perform operations comprising receiving a dataset comprising a plurality of voxels associated with an environment; determining, based at least in part on the dataset, ground truth data comprising at least an occupancy status for individual voxels of the plurality of voxels; determining, based at least in part on the ground truth data, a loss for an individual occupied voxel of the plurality of voxels; determining, based at least in part on the occupancy status for the individual voxels, a density of proximate occupied voxels for the individual occupied voxel; determining, based at least in part on the density of the proximate occupied voxels and the loss, an adjusted loss for the individual occupied voxel; and training a machine-learned (ML) object detection model based at least in part on the adjusted loss.

B: The system of paragraph A, wherein determining the adjusted loss comprises adjusting the loss inversely proportionally to the density of the proximate occupied voxels.

C: The system of paragraph A or B, wherein training the ML object detection model comprises training the ML object detection model to generate, using an input dataset comprising a plurality of input voxels as input, an object label for individual occupied voxels of the plurality of input voxels as output.

D: The system of any of paragraphs A-C, wherein training the ML object detection model comprises training the ML object detection model to generate, using an input dataset comprising a plurality of input voxels as input, an occupancy label for individual voxels of the plurality of input voxels as output.

E: The system of any of paragraphs A-D, wherein the operations further comprise transmitting the ML object detection model to a vehicle configured to traverse a second environment based at least in part on output received from the ML object detection model.

F: A method comprising receiving a dataset comprising a plurality of voxels associated with an environment and loss values for individual voxels of the plurality of voxels; determining a loss for an individual occupied voxel of the plurality of voxels; determining an occupancy status for a subset of the plurality of voxels proximate to the individual occupied voxel; determining, based at least in part on the occupancy status for individual voxels of the subset of the plurality of voxels, a density of proximate occupied voxels; determining, based at least in part on the density of the proximate occupied voxels and the loss, an adjusted loss for the individual occupied voxel; and training a machine-learned (ML) object detection model based at least in part on the adjusted loss.

G: The method of paragraph F, wherein the dataset comprises one or more voxels representing an object protrusion associated with an object in the environment.

H: The method of paragraph F or G, wherein training the ML object detection model comprises training the ML object detection model to generate, using an input dataset comprising a plurality of input voxels as input, output comprising a first object label for a first individual voxel of the plurality of input voxels representing an object, and a second object label for a second individual voxel of the plurality of input voxels representing an object protrusion associated with the object, wherein the first object label and the second object label are a same object label.

I: The method of paragraph H, wherein training the ML object detection model further comprises training the ML object detection model to generate a single contour representing the object and the object protrusion.

J: The method of any of paragraphs F-I, wherein the subset of the plurality of voxels comprises a symmetrical three-dimensional voxel space about the individual occupied voxel.

K: The method of any of paragraphs F-J, wherein the individual occupied voxel represents at least one of sensor data associated with a space in the environment or data based at least in part on the sensor data.

L: The method of any of paragraphs F-K, wherein determining the loss comprises determining ground truth data associated with the dataset; and determining the loss for an individual occupied voxel based at least in part on the ground truth data.

M: The method of any of paragraphs F-L, further comprising configuring the ML object detection model at a vehicle computing device; executing the ML object detection model to generate output; and controlling a vehicle by the vehicle computing device based at least in part on the output.

N: The method of any of paragraphs F-M, wherein the adjusted loss is inversely proportional to the density of the proximate occupied voxels.

O: One or more non-transitory computer-readable media storing instructions that, when executed by one or more processors, perform operations comprising receiving a dataset comprising a plurality of data units associated with an environment; determining a loss for an individual data unit of the plurality of data units; determining an occupancy status for a subset of the plurality of data units proximate to the individual data unit; determining, based at least in part on the occupancy status for individual data units of the subset of the plurality of data units, a density of proximate occupied data units; determining, based at least in part on the density of the proximate occupied data units and the loss, an adjusted loss for the individual data unit; and training a machine-learned (ML) object detection model based at least in part on the adjusted loss.

P: The one or more non-transitory computer-readable media of paragraph O, wherein the individual data unit represents at least one of an occupancy status, a velocity, an acceleration, or a direction.

Q: The one or more non-transitory computer-readable media of paragraph O or P, wherein the occupancy status for the subset of the plurality of data units is determined based on sensor data represented in the subset of the plurality of data units.

R: The one or more non-transitory computer-readable media of any of paragraphs O-Q, wherein the adjusted loss is inversely proportional to the density of the proximate occupied data units.

S: The one or more non-transitory computer-readable media of any of paragraphs O-R, wherein the operations further comprise controlling a vehicle based at least in part on output generated by executing the ML object detection model.

T: The one or more non-transitory computer-readable media of paragraph S, wherein the operations further comprise generating a trajectory for controlling the vehicle based at least in part on the output.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing instructions executable by the one or more processors, wherein the instructions, when executed, cause the system to perform operations comprising:

receiving a dataset comprising a plurality of voxels associated with an environment;

determining, based at least in part on the dataset, ground truth data comprising at least an occupancy status for individual voxels of the plurality of voxels;

determining, based at least in part on the ground truth data, a loss for an individual occupied voxel of the plurality of voxels;

determining, based at least in part on the occupancy status for the individual voxels, a density of proximate occupied voxels for the individual occupied voxel;

determining, based at least in part on the density of the proximate occupied voxels and the loss, an adjusted loss for the individual occupied voxel; and training a machine-learned (ML) object detection model based at least in part on the adjusted loss.

2. The system of claim 1, wherein determining the adjusted loss comprises adjusting the loss inversely proportionally to the density of the proximate occupied voxels.

3. The system of claim 1, wherein training the ML object detection model comprises training the ML object detection model to generate, using an input dataset comprising a plurality of input voxels as input, an object label for individual occupied voxels of the plurality of input voxels as output.

4. The system of claim 1, wherein training the ML object detection model comprises training the ML object detection model to generate, using an input dataset comprising a plurality of input voxels as input, an occupancy label for individual voxels of the plurality of input voxels as output.

5. The system of claim 1, wherein the operations further comprise transmitting the ML object detection model to a vehicle configured to traverse a second environment based at least in part on output received from the ML object detection model.

6. A method comprising:

receiving a dataset comprising a plurality of voxels associated with an environment and loss values for individual voxels of the plurality of voxels;

determining a loss for an individual occupied voxel of the plurality of voxels;

determining an occupancy status for a subset of the plurality of voxels proximate to the individual occupied voxel;

determining, based at least in part on the occupancy status for individual voxels of the subset of the plurality of voxels, a density of proximate occupied voxels;

determining, based at least in part on the density of the proximate occupied voxels and the loss, an adjusted loss for the individual occupied voxel; and training a machine-learned (ML) object detection model based at least in part on the adjusted loss.

7. The method of claim 6, wherein the dataset comprises one or more voxels representing an object protrusion associated with an object in the environment.

8. The method of claim 6, wherein training the ML object detection model comprises training the ML object detection model to generate, using an input dataset comprising a plurality of input voxels as input, output comprising:

a first object label for a first individual voxel of the plurality of input voxels representing an object, and a second object label for a second individual voxel of the plurality of input voxels representing an object protrusion associated with the object, wherein the first object label and the second object label are a same object label.

9. The method of claim 8, wherein training the ML object detection model further comprises training the ML object detection model to generate a single contour representing the object and the object protrusion.

10. The method of claim 6, wherein the subset of the plurality of voxels comprises a symmetrical three-dimensional voxel space about the individual occupied voxel.

11. The method of claim 6, wherein the individual occupied voxel represents at least one of sensor data associated with a space in the environment or data based at least in part on the sensor data.

12. The method of claim 6, wherein determining the loss comprises:

determining ground truth data associated with the dataset; and determining the loss for an individual occupied voxel based at least in part on the ground truth data.

13. The method of claim 6, further comprising:

configuring the ML object detection model at a vehicle computing device;

executing the ML object detection model to generate output; and controlling a vehicle by the vehicle computing device based at least in part on the output.

14. The method of claim 6, wherein the adjusted loss is inversely proportional to the density of the proximate occupied voxels.

15. One or more non-transitory computer-readable media storing instructions that, when executed by one or more processors, perform operations comprising:

receiving a dataset comprising a plurality of data units associated with an environment;

determining a loss for an individual data unit of the plurality of data units;

determining an occupancy status for a subset of the plurality of data units proximate to the individual data unit;

determining, based at least in part on the occupancy status for individual data units of the subset of the plurality of data units, a density of proximate occupied data units;

determining, based at least in part on the density of the proximate occupied data units and the loss, an adjusted loss for the individual data unit; and training a machine-learned (ML) object detection model based at least in part on the adjusted loss.

16. The one or more non-transitory computer-readable media of claim 15, wherein the individual data unit represents at least one of an occupancy status, a velocity, an acceleration, or a direction.

17. The one or more non-transitory computer-readable media of claim 15, wherein the occupancy status for the subset of the plurality of data units is determined based on sensor data represented in the subset of the plurality of data units.

18. The one or more non-transitory computer-readable media of claim 15, wherein the adjusted loss is inversely proportional to the density of the proximate occupied data units.

19. The one or more non-transitory computer-readable media of claim 15, wherein the operations further comprise controlling a vehicle based at least in part on output generated by executing the ML object detection model.

20. The one or more non-transitory computer-readable media of claim 19, wherein the operations further comprise generating a trajectory for controlling the vehicle based at least in part on the output.

* * * * *